G. Amici,
Rocket.
No. 41,173.   Patented Jan. 5, 1864.
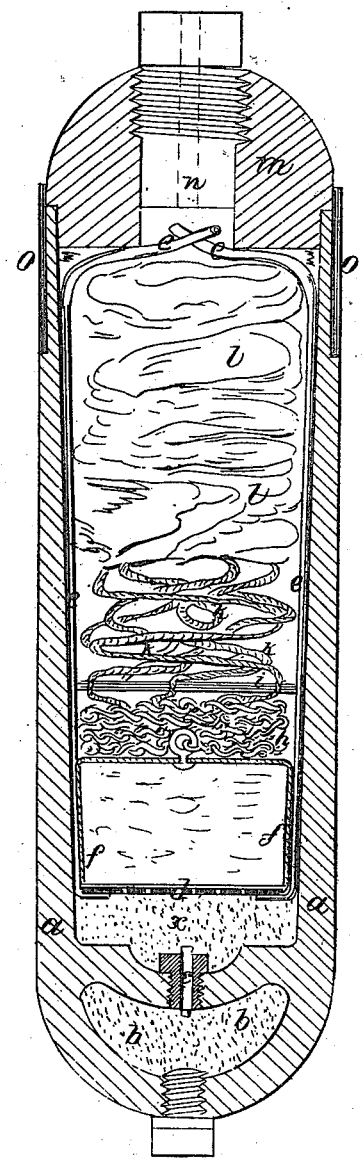

UNITED STATES PATENT OFFICE.

GAETANO AMICI, OF COPENHAGEN, DENMARK, ASSIGNOR TO THORVALD F. HAMMER, OF BOSTON, MASSACHUSETTS.

IMPROVEMENT IN AN ILLUMINATING AND SIGNAL SHELL.

Specification forming part of Letters Patent No. 41,173, dated January 5, 1864.

*To all whom it may concern:*

Be it known that I, GAETANO AMICI, of Copenhagen, in the Kingdom of Denmark, have invented a new and useful apparatus called an "Illuminating and Signal Shell," to be fired out of ordnance; and I do hereby declare that the following is a full and exact description thereof, reference being had to the accompanying drawing, and to the letters of reference marked thereon.

The drawing represents a vertical section of the shell.

$a\ a$ is a cast-iron shell provided with a separate powder-chamber, $b\ b$.

$c$ is a fuse-hole for fuse, leading from inside of shell to said chamber $b$.

$d$ is a perforated shield; $e\ e$, two quick-matches passing up the shell to fuse-hole $n$. The space $x$, between fuse $c$ and shield $d$, is charged with powder.

$f\ f$ is an illuminating or signalizing pot, charged with luminous matter. Attached to top of pot $f$ is a chain, $h$, connecting the same with spreader and shield $i$. A number of lines, $k\ k\ k$, hold a cloth, $l$, made of any suitable material, to the spreader or shield $i$. The wooden cap $m$ is provided with a fuse-hole, $n$, for the insertion of fuse. Ring $o\ o$, outside of shell, closes the joint between cap $m$ and shell $a$. Chamber $b$ may be left off, and the time-fuse $n$ inserted in that end.

This shell, when fired from ordnance, ignites, by means of fuse in fuse-hole $n$ of cap $m$, the two matches $e\ e$, which communicate the fire and ignite the powder in powder-chamber $x$ and the time-fuse $c$.

By the explosion of powder in chamber $x$ the shield $d$, pot $f$, with luminous matter in blaze, chain $h$, spreader $i$, lines $k\ k$, cloth $l$, and cap F are forced out of the shell. The shell continues its flight and explodes by means of time-fuse $c$ and powder in chamber $b$ at its intended place. The cloth $l$, however, spreads itself soon, and, forming a parachute, floats in the air, carrying the illuminating-pot $f$, suspended by parachute-lines $k\ k$ and chain $h$, through its course, the burning luminous matter within pot $f$ diffusing a powerful and brilliant light until all the matter is burnt out.

The object of this invention is to create at night at a high altitude a light of several minutes' duration, and of such a magnitude as to illuminate a large space below for the purpose of reconnoitering on land or water, or serving as a signal-light, in which case pot $f$ may be charged with luminous matter, throwing off colored light.

I do not claim a parachute with illuminating-pot attached, as this has been applied before in skyrockets for pyrotechnical purposes; but

What I claim as my invention is—

1. The combination of a parachute and its attached illuminating-pot with a shell of suitable form and material to be fired from a gun or mortar.

2. The shield and spreader $i$, for the purpose of preventing the lines $k\ k$ from becoming entangled with the chain $h$ and pot $f$, and for facilitating the spreading of the parachute, the whole constructed substantially as herein set forth, and for the purpose described.

Copenhagen, November 7, 1863.

GAETANO AMICI.

Witnesses:
T. S. PETERSEN,
WILLIAM HAMMER.